US007501573B2

(12) United States Patent
Balfour, Jr.

(10) Patent No.: US 7,501,573 B2
(45) Date of Patent: Mar. 10, 2009

(54) SUBGRADE VAULT WITH LATCHING COVER

(75) Inventor: William J. Balfour, Jr., Torrington, CT (US)

(73) Assignee: Oldcastle Precast, Inc., Auburn, WA (US)

( * ) Notice: Subject to any disclaimer, the term of this patent is extended or adjusted under 35 U.S.C. 154(b) by 0 days.

(21) Appl. No.: 11/879,084

(22) Filed: Jul. 16, 2007

(65) Prior Publication Data

US 2009/0020304 A1    Jan. 22, 2009

(51) Int. Cl.
*H02G 9/00* (2006.01)

(52) U.S. Cl. .................. 174/37; 174/38; 174/135; 174/50; 174/59; 174/63; 248/291.1; 361/695; 52/33; 109/53

(58) Field of Classification Search ............ 174/37, 174/38, 135, 50, 59, 63; 220/3.2, 3.3, 3.8, 220/4.02; 248/291.1; 285/64; 361/695; 52/20, 33, 34, 169.6, 21, 36.5, 649.8, 220.8; 109/53, 58

See application file for complete search history.

(56) References Cited

U.S. PATENT DOCUMENTS

| 2,059,941 | A | * | 11/1936 | Friedel et al. ................. 27/35 |
| 4,446,797 | A | * | 5/1984 | French ..................... 109/53 |
| 4,776,138 | A | * | 10/1988 | Sumner et al. ............... 52/20 |
| 4,982,585 | A | * | 1/1991 | Davis et al. ................. 70/269 |
| 5,111,000 | A | * | 5/1992 | Maraldo .................... 174/38 |
| 5,395,019 | A | * | 3/1995 | Christensen ............. 224/511 |
| 6,861,584 | B2 | * | 3/2005 | Hutchin et al. ............. 174/50 |
| 7,299,667 | B1 | * | 11/2007 | Miresmaili et al. .......... 70/58 |
| 7,381,888 | B2 | * | 6/2008 | Burke et al. ................ 174/38 |

* cited by examiner

*Primary Examiner*—Dhiru R Patel
(74) *Attorney, Agent, or Firm*—Sheridan Ross P.C.

(57) ABSTRACT

A subgrade vault with a latching cover. The vault includes a peripheral wall with an open access port at the top. A peripheral ledge surrounds the access port. A cover to close the access port fits inside it, with a latch assembly inside it and a retractable latch pin disposed to fit in an aperture in the peripheral ledge. The latch pin is retractable by the stabbing motion of a tapered tool against a cam surface on the latch pin. The cover is locked in place merely by pressing down on it.

9 Claims, 3 Drawing Sheets

SUBGRADE VAULT WITH LATCHING COVER

FIELD OF THE INVENTION

A subgrade vault with latching cover and a reliable latch for the cover.

BACKGROUND OF THE INVENTION

Subgrade vaults are widely used where circuits from major access lines branch off to distribution lines. Examples exist where distribution lines depart from a major access lines to serve an individual house. Other vaults might serve a part of a drainage or a water supply system, and can provide a chamber for valves, switches and connections.

These vaults have in common a peripheral wall, an open bottom and a top access port. The peripheral wall is provided with openings to pass the lines.

A cover is provided that seats on the vault to close the access port It is made strong enough to support anticipated static and dynamic loads that may be exerted on it by persons or vehicles. Importantly, the cover must reliably close the access port and be firmly and reliably in place when not attended.

While this as an obvious requirement, its observation is sometimes uncertain. These vaults are installed with the access port at or beneath grade, and frequently are below drainage water levels. They are intended to blend into their surroundings. Often the color of the vault and cover approach the color of a surrounding lawn or golf course, and their presence or absence is often not noticed.

The preferred material of construction for the vault and cover is high density polyethylene which has a specific gravity of about 0.95. If desired, additives such as glass fibers can be mixed into the resin. Also, materials other than resins can be sued for the structures, cementitious material for example. While as a practical matter a vault or cover of this material is not especially buoyant, neither does it because of its weight and specific gravity exert much resistance to a sufficient force of water. An unrestrained cover atop a rising flow of water, or a partially raised cover in the path of a swift flow of water, can readily be displaced and perhaps carried away. In either event, the open access port is unlikely to be visible, and a person or vehicle can unwittingly step or fall into it and be injured.

It is an object of this invention to provide a vault with a cover that can readily and reliably be attached to the vault to close the access port. The exertions required for this purpose are those which are general behavior, requiring no tool and no special observance of a procedure. Merely stepping on the cover will do the job.

Another important feature is the ready removal of the cover to open the access port for service. A common tool carried by every maintenance person will suffice, although a specific type of the tool is needed. The unlatching operation is a simple one-handed task, but the cover will not be released unless the exertion is properly done.

A further advantage of this vault and cover is that the entire latching mechanism except for a protruding latch pin is entirely within the envelope of the cover.

BRIEF DESCRIPTION OF THE INVENTION

A subgrade vault has a peripheral wall pierced with openings to pass access lines and distribution lines. It provides room for interconnections in some installations such as valves terminals and splice closures. It customarily has an open bottom and in this invention always has an access port at its top.

The access port is surrounded by a peripheral ledge including an upwardly facing support surface upon which the cover will rest when in place while nested in and closing the access port. A downwardly-facing latch surface is integral with the peripheral wall, below the level of the upwardly facing support surface.

A spring loaded latch assembly pin is mounted in the cover. The latch pin when extended will engage the latch surface to prevent upward movement of a seated cover. The latch assembly is underneath the top of the cover, and above the bottom of the cover. A deflector cam surface on the pin is engageable to the ledge to retract the latch pin while the cover is pressed into place. When the cover is properly placed, a bias spring will extend the latch pin to its locked position below the latch surface.

A retraction cam surface is also formed in the latch pin. It is disposed at an angle such that an appropriate downward push on it will shift the latch pin inwardly to retract it from the latch surface, allowing the cover to be removed.

A tool port in the cover will pass and guide a suitably dimensioned tool toward and against the retraction cam surface to retract the latch pin. Preferably the latch pin also includes a slot which will pass the end of the tool when the latch is retracted so the tool will hold the latch pin in its retracted position until the tool is removed. When the tool is removed the latch pin will again extend and be ready when the cover is again to be placed in the access port.

The cover will not latch unless it is correctly aligned. Its geometric shape relative to the boundary of the access port facilitates the correct alignment, and latching takes with no more effort than a downward force such as a person stepping on it. Release requires no more than the stabbing movement of a simple tool.

The above and other features of this invention will be fully understood from the following detailed description and the accompanying drawings, in which:

DETAILED DESCRIPTION OF THE INVENTION

Figure 2:
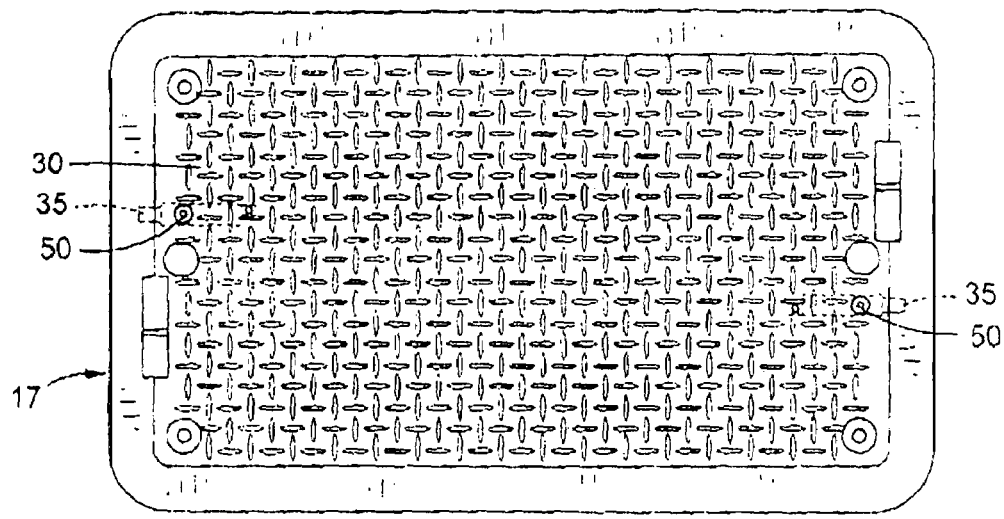
FIG. 2 is a top view of FIG. 1.
Figure 1:
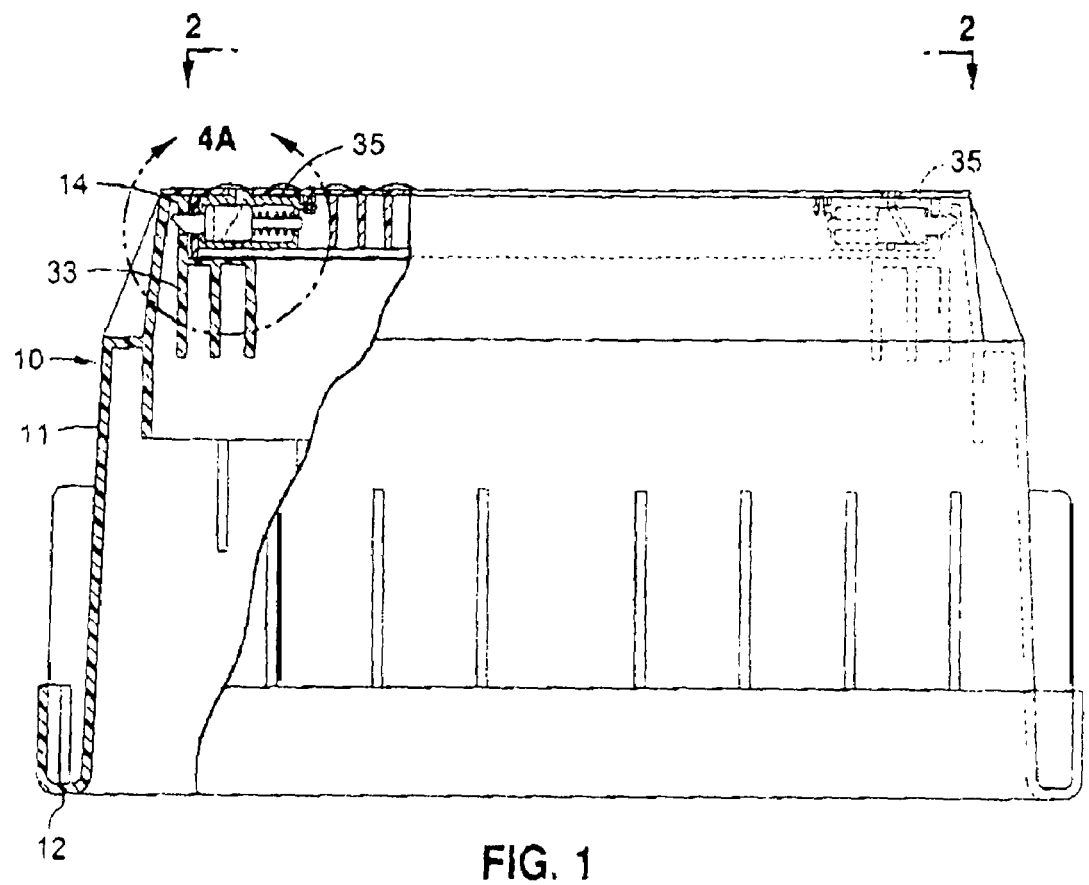
FIG. 1 is a side elevation partly in cutaway cross-section, of the presently preferred embodiment.

A vault 10 according to this invention includes a peripheral wall 11, usually in a rectangular shape, with an open bottom 12 and an open access port 13 in its top 14. A peripheral ledge 15 surrounds the access port.

An upwardly facing support surface 16 of the ledge provides a nest for a cover 17 to be described. Conveniently, ledge 15 includes a shoulder which has a downwardly-extending sidewall 18 with a latch aperture 19 in it, forming a downwardly-facing latch surface 22.

Especially when the vault is made of molded material, the peripheral and sidewalls and other parts will be shaped appropriately for strength of body and for moldability. The ledge is conveniently peripheral and has an active part in locking, unlocking, and retaining the cover, but as will be shown, these functions could be placed elsewhere for the same function.

Figure 3:
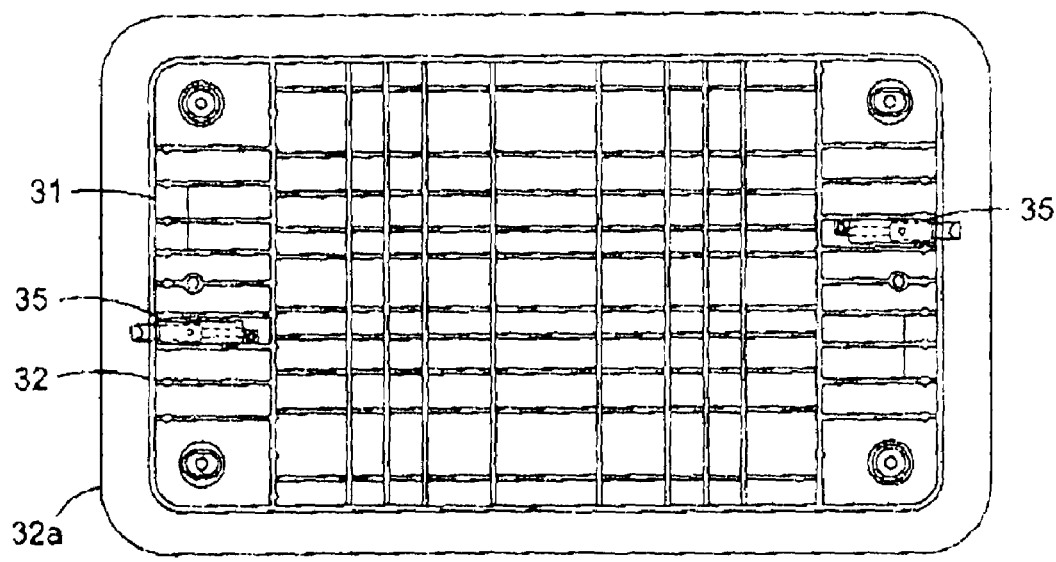
FIG. 3 is a bottom view of the cover.
Figure 5:
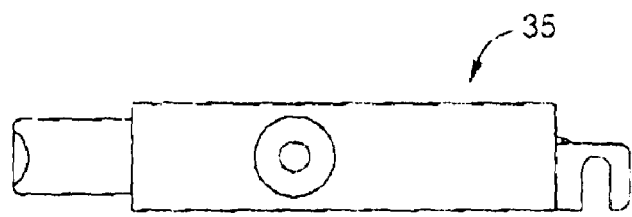
FIG. 5 is a top view of the latch assembly taken at the top of FIG. 7.
Figures 6, 7:
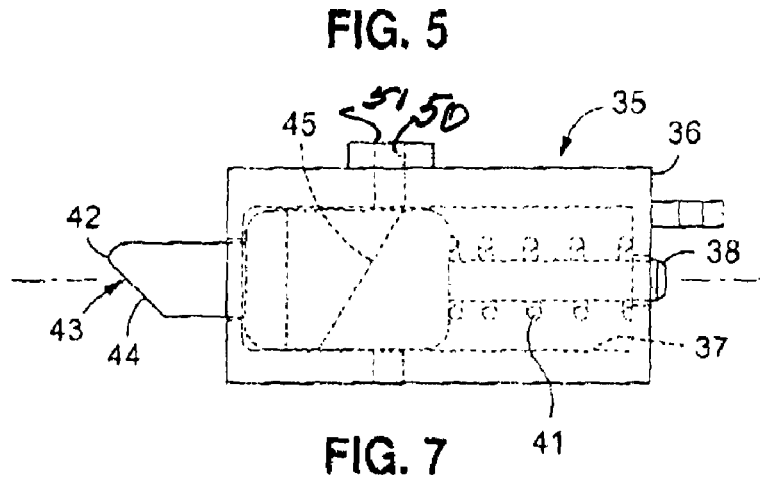
FIG. 6 is an end view of FIG. 7.
FIG. 7 is a side view of the latch assembly, partly in shaped notation to show interior structure.
Figure 8:
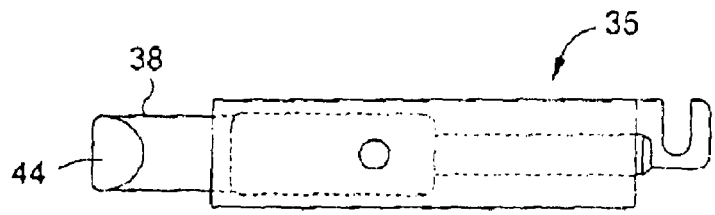
FIG. 8 is a bottom view of FIG. 7.

Cover 17 (FIG. 2) has an upper surface 30, an underside 31 (FIG. 3) a depending alignment wall 32, and an overhanging lip 32a. When properly installed, wall 32 will nest inside sidewall 18 with lip 32a resting on the support surface, The underside of the cover will customarily include a pattern of ribs 33 are provided to enhance the vertical load capacity of the cover downward loads. The cover has a top surface 32b and a bottom 32c formed by the bottom ends of the ribs. The ribs form recesses 32d.

These ribs can be employed to hold a latch assembly 35 in one of recesses 32d by means of screws or some other fastening device. Latch assembly 35 includes a body 36 with an internal slot 37 to hold a latch pin 40 for sliding movement toward and away from the periphery of sidewall 18. The latch assembly is entirely contained inside the cover below the top of the cover and above the lower edge of the skirt, with only the latch pin extending beyond it.

A bias spring 41 biases the latch pin toward its extended position, with its tip 42 extending beyond wall 32. The latch pin has at its free end 43 a downwardly facing deflector surface 44 formed at such an angle that pressing it down against the ledge will retract the latch pin against the spring bias. This will enable it to engage the ledge, be retracted, pass along sidewall 18, and when the latch pin has passed to the aperture, will snap back under the latch surface to lock the cover in place.

Figure 4A:
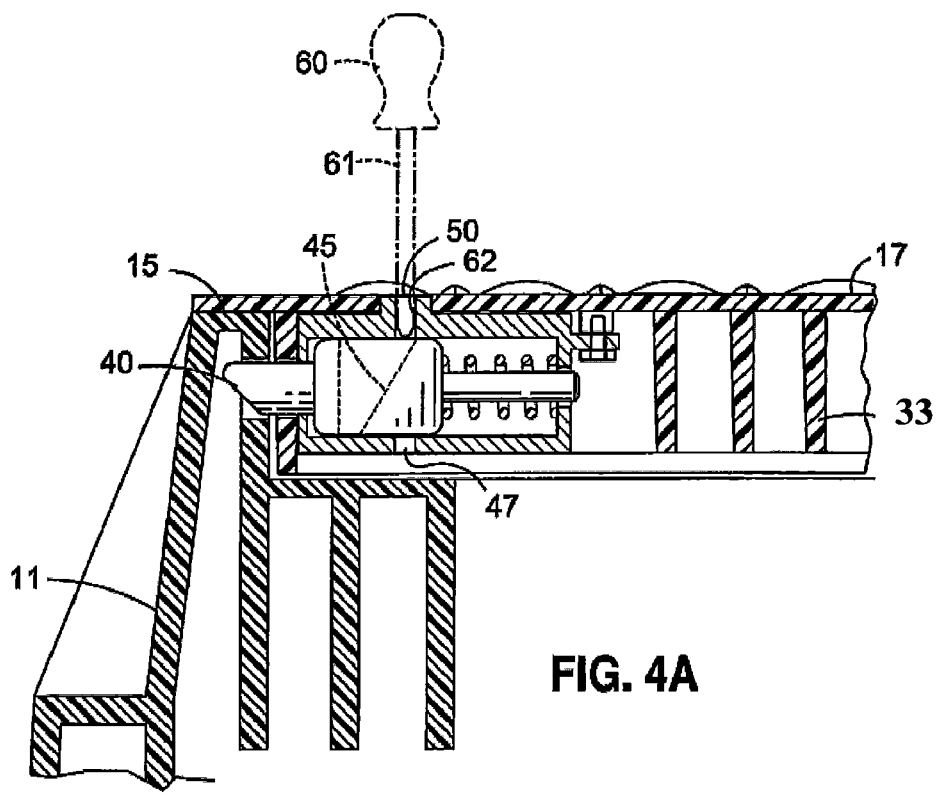
FIG. 4A is a fragmentary cross-section taken at region 4A in FIG. 1 showing the installed cover.

The latch pin includes a retraction cam surface 45, which faces upwardly. It is formed at an angle, usually about 30 degrees such that a force applied as described below will retract the latch pin against the spring bias. At its lower edge 46 of surface 45, the latch pin is pierced by a port 46 (FIGS. 4A and B). The latch body may be pierced by a port 47 that is below the latch pin.

A tool port 50 is formed in the latch body aligned with cam surface 45 when the latch pin is extended. It is accessible through a tool port 51 opening through the top of the cover. The force of a tool pushed through tool port 51 and through channel 57 against surface 45 will retract the latch pin to release the cover.

When the latch pin is retracted, the tool shank will pass through the port 46 and into port 47 and will retain the latch pin retracted until it is removed. Unlatching requires no more than a straight-through push on a tool, and as will be seen, the tool itself is readily retained in place as long as it is needed to hold the latch pin retracted.

The tool itself is a cross-blade screwdriver usually a Phillips head type, or any shanked tool with an end which can properly push against retraction surface 46 and retract the latch pin. A straight screwdriver will not work properly because its sharp point will not bear properly on the surface. A tapered pointed tool, even a conical device with a nearly matching angle, will serve. However, a common cross-blade screw driver is carried by almost every workman in fields related to this invention, and is the tool of first choice. The coefficient of friction and locking angles will be considered in this design.

The latch can be placed elsewhere on the cover, but there must always be a latch surface on the vault engageable by the latch pin, and an aperture at least as large as the thickness of the latch pin to allow for installation and removal of the cover.

It is most convenient to provide a pair of these latch assemblies, facing in opposite directions, and displaced sidewardly from one another, each close to a parallel edge and spaced from the center, near diagonally opposite corners.

Figure 4B:
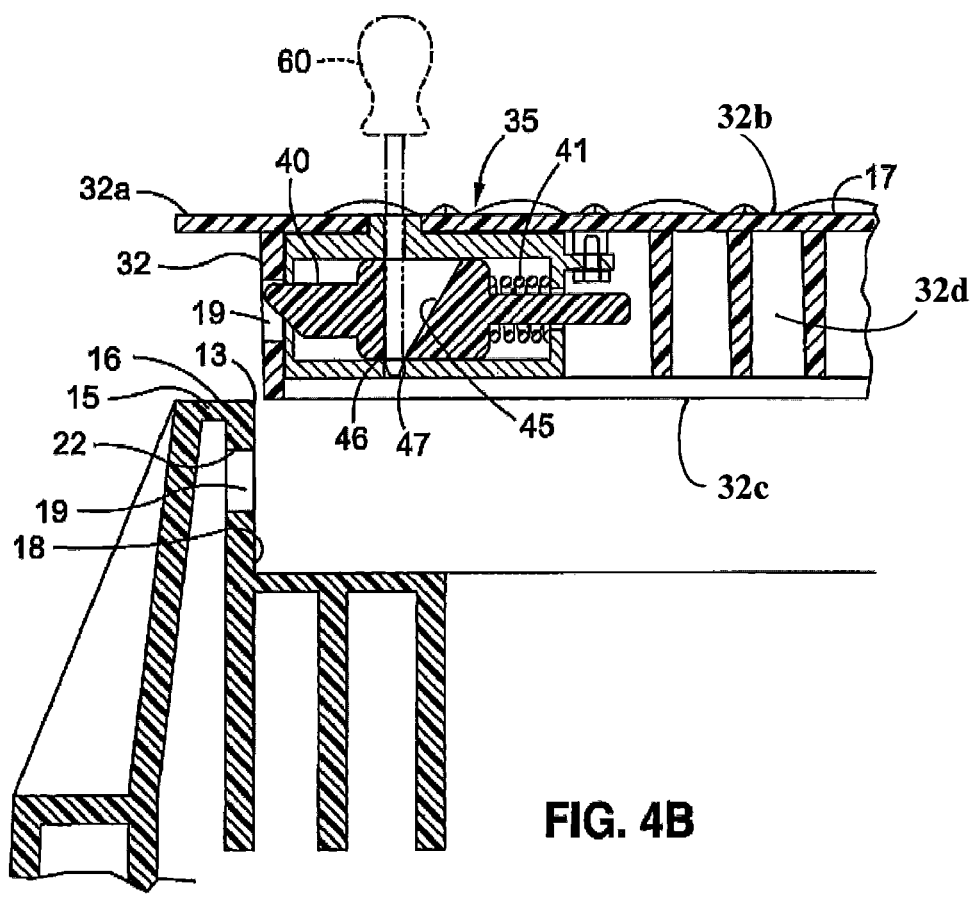
FIG. 4B is a view similar to FIG. 4A, but with the cover in the process of removal from the vault.

Tool 60, as illustrated in FIGS. 4A and 4B a conventional four-blade phillips screwdriver has a shank 61, and a tapered end 62. In FIG. 4A the cover is shown already installed. It fits in the access port and nests in it. Its lip rests on the ledge. The latch pin is in the aperture, and the cover is firmly locked in place. The tool is not needed for installation. It is needed for removal.

The installation procedure was merely to place the cover atop the ledge and step on it. The latch pin was retracted by contact with the ledge and held retracted by the sidewall until it reached the latch aperture.

Removal is shown in FIG. 4B. The tool has been inserted in through the opening in the latch, pressed against the retraction surface, and preferably passed through the latch body so the cover can conveniently be reversed.

In summary, this cover when being installed will not look or feel right to the installer unless it is squarely aligned. Then a downward shove, such as stepping on it will cause it to assume a nested position and lock in place. This almost automatic procedure can be regarded as very reliable.

Then, when the event arises that the cover is to be removed, a simple shove of the tool through the tool port will release it. Usually some provisions will be present in the cover for engagement of a hook or claw to engage it.

This invention thereby provides a vault and cover that are reliably retained together and readily separated, with the cover firmly restrained against removal except by exertion of an appropriate tool.

This invention is not to be limited by the embodiment shown in the drawings and described in the description, which is given by way of example and not of limitation, but only in accordance with the scope of the appended claims.

I claim:

1. In combination:
    a vault having a peripheral wall and an upper access port surround by a ledge, the access port being internally bounded by a sidewall;
    a cover to close the said access port, said cover having a lip to rest on said ledge and a skirt so proportioned and arranged that when it is properly placed it will nest in said access port against said sidewall;
    a latch aperture in said sidewall forming a latch surface;
    a latch assembly mounted to said cover including a body, a latch pin having a deflector surface and a retraction surface, both at a respective angle for retraction of the latch pin, said latch assembly being placed where said deflector surface will engage the ledge so that the latch pin will be retracted while the cover is pressed onto the vault, will be extended to engage in said aperture when the cover is in place, and will be retracted when a tool is pressed against the retraction surface to retract the latch pin when the cover is to be released.

2. A combination according to claim 1 in which the cover includes a tool port aligned with said latch assembly, such that the shank of a tool passed through the tool port and pressed against said retraction surface will retract the latch pin to release the cover from the vault.

3. A combination according to claim 1 further including a retraction tool, said tool having a shank with a shaped end such that when pressed against the retraction surface, it will cause the latch pin to retract.

4. A combination according to claim 3 in which said shaped end is a tapered multiple blade screw driver.

5. A combination according to claim 1 in which at least two of said latch assemblies are provided, disposed at spaced-apart locations around the cover.

6. A combination according to claim 1 in which said latch assembly is contained within the boundary of said skirt.

7. A cover removably to close an upper access port in a subgrade vault, said access port being bounded by a ledge and an internal sidewall, said sidewall having a latch aperture there-through, said cover comprising:
- a cover body having a peripheral lip disposed and arranged so as to rest on said ledge, and a depending peripheral skirt to nest within said ledge, and
- a latch assembly including a body, a latch pin having a deflector surface and a retraction surface, both at a respective angle for retraction of the latch pin, said latch assembly being placed where said deflector surface will engage the ledge so that the latch pin will be retracted while the cover is pressed onto the vault, will be extended to engage in said aperture when the cover is in place, and will be retracted when a tool is pressed against the retraction surface to retract the latch pin when the cover is to be released.

8. A cover according to claim 7 in which the cover includes a tool port aligned with said latch assembly, such that the shank of a tool passed through the tool port and pressed against said retraction surface will retract the latch pin to release the cover from the vault.

9. A cover according to claim 8 in which said latch assembly is contained within the boundary of said skirt.

\* \* \* \* \*